Feb. 25, 1941.	A. E. PAPP ET AL	2,232,963
ELECTRICAL CONNECTION
Original Filed Aug. 17, 1936    2 Sheets-Sheet 1
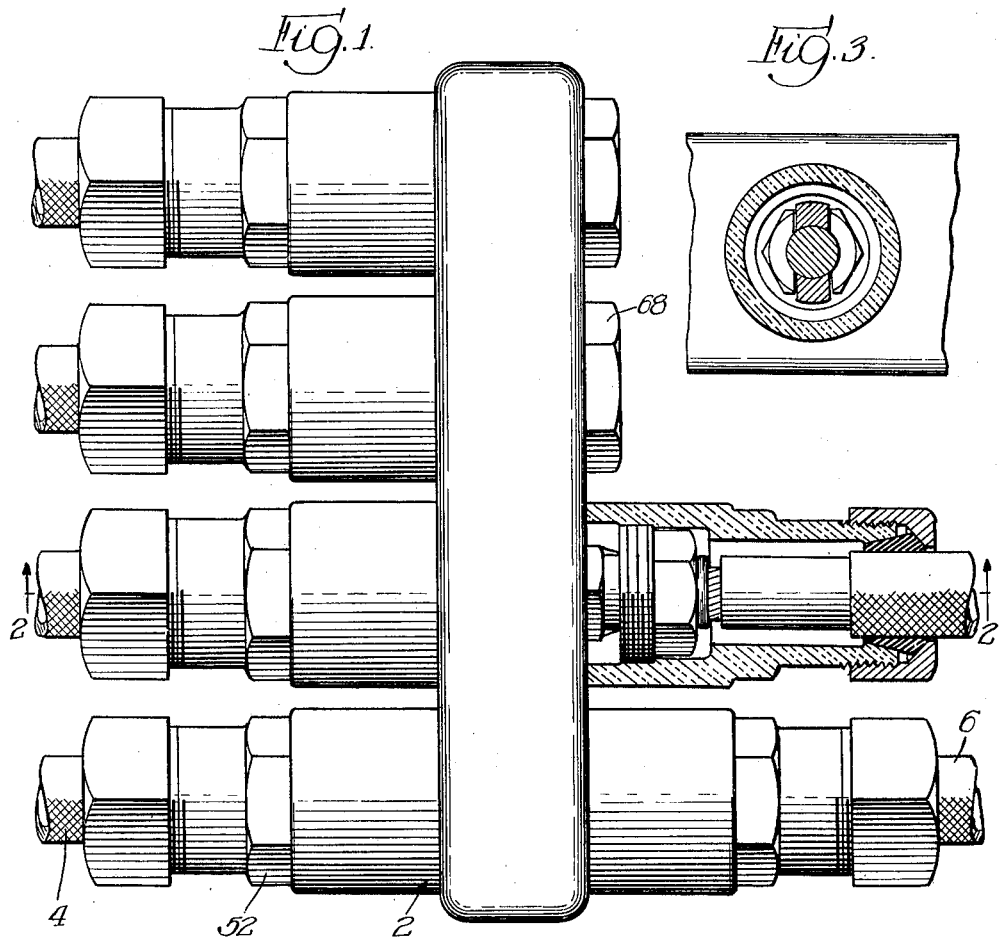
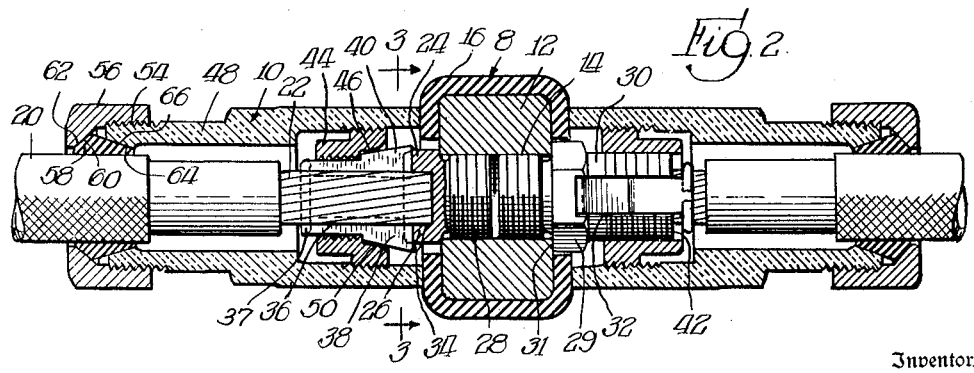
Inventors:
ANDREW E. PAPP
JOHN L. WINKS, DECEASED
BY EMILY N. WINKS, ADMINISTRATRIX
By Wilkinson, Huxley, Byron & Knight
Attorneys.

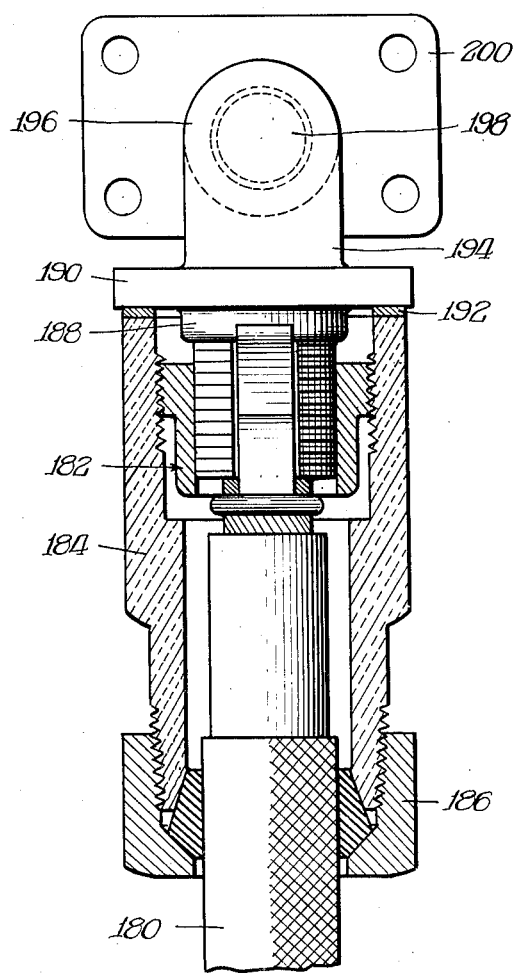

Patented Feb. 25, 1941

2,232,963

UNITED STATES PATENT OFFICE 2,232,963

ELECTRICAL CONNECTION

Andrew E. Papp, Chicago, Ill., and John L. Winks, deceased, late of Chicago, Ill., by Emily N. Winks, administratrix, Chicago, Ill., assignors to G & W Electric Specialty Co., Chicago, Ill., a corporation of Illinois Original application August 17, 1936, Serial No. 96,382. Divided and this application January 3, 1939, Serial No. 249,137

3 Claims. (Cl. 173—269)

The present invention relates to electrical devices, and more in particular to novel means for effecting a connection between cables in an underground system of electrical distribution, this application being a division of a copending application Serial No. 96,382, filed August 17, 1936 and granted as Patent No. 2,195,630.

Heretofore cables have been connected together or spliced by hand taping in the field. Such a joint is unsatisfactory from many standpoints, the principal objections being that the cables are not effectively connected together, the connections are not entirely moisture-proof and are rather cumbersome and difficult to effect in the field.

The present invention therefore has as an object the idea of providing simple and compact means for easily and readily connecting cables together, the same being water-proof throughout, and being readily accomplished in the field.

The present invention comprehends the idea of providing novel means of simple construction for effecting a connection between a plurality of cables in an underground system of distribution, such means being so constructed and arranged that the cables may be easily and readily connected or disconnected.

Another object of the present invention is to provide a novel means for connecting a plurality of cables together in an underground system of distribution wherein the connection between the cables is compact and completely enclosed to provide a water-tight joint between such cables. More particularly, such means is formed with a housing of insulated material completely protecting the connections between the cables.

Still another object of the present invention is to provide a novel connection between a plurality of cables, such connection including as an element a bus bar or connecting member enclosed by a covering of resilient or compressible insulating material. More specifically, the bus bar or connecting member is provided with a covering of rubber molded in situ over said bus bar or connecting member.

The present invention also includes as an object the idea of connecting a plurality of cables to a bus bar or connecting member as described above by means of connectors, each terminal end of the cables and the associated connector being suitably enclosed by an insulator drawn into tight engagement with the resilient or compressible covering for the bus bar or connecting member at one end and having a novel joint between its other end and the cable.

A still further object of the present invention is to provide novel connectors for connecting or anchoring cables to an element or elements in a system of electrical distribution, such elements, for example, being the bus bar or anchoring support of a switchboard or the like. More particularly, the connectors, where used for connecting the cables to the bus bar, are so constructed as to accommodate the cables when disposed in alignment or in staggered relation.

The present invention further comprehends the idea of providing a novel connector for anchoring or supporting one or more cables, such connector being provided with means for supporting the cable, and an insulator provided with a water-tight joint between the same and the cable.

Other objects, features, capabilities and advantages are comprehended by the invention, as will later appear and as are inherently possessed thereby.

Referring to the drawings:

Figure 1 is a top plan view of means for connecting a plurality of cables, a part thereof being disclosed in cross-section to show elements of the connecting means more in detail;

Figure 2 is a view in cross-section taken in the plane represented by line 2—2 of Figure 1 of the drawings;

Figure 3 is a fragmentary view in cross-section taken in the plane represented by line 3—3 of Figure 2 of the drawings; and Figure 4 is a view partly in cross-section and partly in elevation of a connector for anchoring or securing the cable to a support.

Referring now more in detail to the drawings, a connecting means, generally referred to as 2, is disclosed for connecting together a plurality of cables such as 4 on one side of the connecting means, and cables such as 6 on the opposite side of the connecting means. The connecting means 2 disclosed in the drawings is particularly adapted for use in connecting cables such as 4 and 6 in an underground system of electrical distribution. The connecting means comprises a connector assembly 8 to which the cables 4 and 6 are connected in alignment by connectors 10 which are of similar construction, one only of which will be hereinafter referred to.

The connector assembly 8 is formed with a drawn copper bar 12 having a plurality of transversely extending threaded openings 14 therethrough, these threaded openings serving to provide means whereby the connector means 10 are secured to the connector assembly. The bar 12 is insulated and protected by an insulating covering 16 which, in accordance with the present invention, is of rubber of gasket stock and oil and water-resisting and which is molded in situ on the bar 12. It is of course understood that in the molding of the rubber insulating material on the drawn copper bar 12, suitable openings in this insulating covering are provided in alignment with the openings 14 provided in the bar.

The cables to which the connector means 10 are secured are of the sheathed type each having the sheath 20 removed adjacent the terminal end of the cable to expose the cable strands 22. This terminal end of the cable is secured to the bar 12 by means of a connector 24. This connector 24 comprises a cable receiving member 26 which is formed with a threaded stud portion 28 at one end adapted to be threaded in the threaded opening 14 for securing the cable and the connector means to the bus bar or connecting member as by means of applying a tool to the non-circular portion 29 whereby this non-circular portion abuts the face of the bus bar or connecting member adjacent the opening as at 31. This cable receiving member 26 is formed at its other end with a sleeve 30 which is provided with oppositely disposed slots 32. Disposed between the sleeve 30 and the threaded stud portion 28 is provided a recess 34 which is adapted to receive the extreme end of the cable terminal for a purpose to be hereinafter more fully disclosed.

Disposed within the sleeve 30 and mounted upon the cable terminal is a split wedge or clamping member 36 formed with wedge elements 38 and 40 adapted to extend through the slots 32 of the cable receiving member and a collar 37 adapted to embrace said cable. The sleeve portion 30 is provided with external threads 42 and is adapted to threadedly receive the wedge following member 44 which is provided with an annular wedge element 46 adapted to engage the wedge elements 38 and 40 upon movement of the same with respect to the cable receiving member to force the wedge elements 38 and 40 into gripping engagement with the cable strands. The extreme end of the cable terminal is prevented from becoming frayed or moving outwardly under the clamping action of the wedge elements 38 and 40 by the side walls of the recess 34 which effectively retains the same in place.

In order to protect the connector 24 and the terminal end of the cable, the connector means further includes a housing 48 in the form of a nipple or sleeve which may be of molded Bakelite construction, or any other suitable insulating material, this sleeve threadedly engaging the wedge follower 44 as at 50 whereby the same may be forced into intimate abutting relation with the resilient insulating covering 16 of the bus bar or connecting member by means of applying a tool to the non-circular portion 52.

The outer end of the nipple or sleeve 48 is threaded as at 54 to threadedly receive the gland nut 56 which serves to compress a rubber bushing 58 between the nipple and the sheath 20 of the cable to provide a tight yet flexible joint at the outer extremity of the nipple 48. In order to provide an effective joint, the resilient or compressible rubber bushing is provided with an inclined wedge surface 60 adapted to cooperate with a wedge surface 62 formed on the compression nut 58 and is further provided with wedge surface 64 adapted to cooperate with a similar wedge surface 66 provided on the interior of the sleeve 48 at its outer extremity.

It will be quite apparent from the above description that the cables are effectively connected together by the connector means described, and such connection between the cables is fully protected by the housing formed in part by the non-resilient sleeves 48 of insulating material and in part by the resilient or compressible covering 16 of insulating material. Furthermore, the resiliency of the insulating covering or material 16 provides for a tight joint between the same and the sleeves 48 when the same are forced into place, and a tight joint is provided at the extremity of each of the sleeves 48 and the cables by means of the resilient or compressible bushings 58 which are effectively forced into place to provide the tight joints between the cables and the connector means. Openings in the bus bar or connecting member on either one or both sides thereof which are not used for securing cables to the bar or connecting member may be closed by blank plugs 68 of insulating material if desired, to provide the completed housing referred to hereinbefore.

The present invention also comprehends the idea of providing a novel connector for anchoring or securing a cable to an element or elements in a system of electrical distribution. For example, in Figure 4 of the drawings, the cable 180 has secured at its unsheathed terminal end a connector 182 constructed essentially to correspond to the connector shown in Figures 1 to 3 inclusive of the drawings. This connector and terminal end of the cable are enclosed by a housing in the form of a sleeve of non-resilient insulating material 184 between one end of which and the cable 180 is a joint 186 constructed in accordance with similar joints disclosed in Figures 1 to 3 inclusive of the drawings. The connector 182 varies from the connector of Figures 1 to 3 inclusive in that the cable receiving member 188 thereof is provided with flanges 190 adapted to abut the sleeve 184 to provide a tight joint therebetween, a gasket 192 being used, if desired. Furthermore, this member 188 is formed with a flat extension 194 formed with an eye 196 which is adapted to fit over the stud 198 disposed on a bracket 200 which may be secured to a switchboard or the like.

It will be quite apparent from the above description that the embodiments disclosed herein and which are used for connecting or anchoring cables provide compact and water-proof means which can be readily assembled and disassembled as desired. Such connector means eliminates the necessity of taping in the field and as has been disclosed, serves to connect cables under varying structural conditions.

While we have herein described and upon the drawings shown illustrative embodiments of the invention, it is to be understood that the invention is not limited thereto but may comprehend other constructions, arrangements of parts, details and features without departing from the spirit of the invention.

We claim:

1. A cable connector comprising a cable receiving member having a bore extending axially inwardly from one end thereof, said member having a radially disposed slot extending axially from said end and communicating with said bore, a wedge member having a collar embracing said cable and having a wedge element disposed in said slot, said wedge element being provided with a wedge surface radially exterior of said cable receiving member and being inclined toward said end, and a wedge follower threaded on said cable receiving member adjacent said end and cooperating with said wedge element for urging said wedge element into wedging relation with said cable.

2. A cable connector comprising a cable receiving member having a bore extending axially inwardly from one end thereof, said member having a radially disposed slot extending axially from said end in communication with said bore and terminating in spaced relation from the inner end of said bore to provide for an uninterrupted recess at the end of said bore for receiving the end of said cable, a wedge member having a collar embracing said cable and having a wedge element disposed in said slot, said wedge element being provided with a wedge surface radially exterior of said cable receiving member and being inclined toward said end, and a wedge follower threaded on said cable receiving member adjacent said end and cooperating with said wedge element for urging said wedge element into wedging relation with said cable.

3. A cable connector comprising a cable receiving member having a bore extending axially inwardly from one end thereof, said member having a radially disposed slot extending axially from said end and communicating with said bore, a wedge member having a collar embracing said cable disposed axially exteriorly of said end and a wedge element disposed in said slot, said wedge element being provided at its end disposed adjacent the inner end of said slot with a part having a wedge surface radially exterior of said cable receiving member and being inclined toward said end thereof and an intermediate part disposed radially inwardly of the circumference of said cable receiving member and connecting said first-named part with said collar, and a wedge follower embracing said cable receiving member and said wedge element, said wedge follower being threaded on said cable receiving member adjacent said end and having a wedge surface cooperating with the wedge surface of said wedge element for urging said wedge element into wedging relation with said cable.

ANDREW E. PAPP.
EMILY N. WINKS,
*Administratrix of the Estate of John L. Winks, Deceased.*